United States Patent
Laroche et al.

(10) Patent No.: US 8,655,278 B2
(45) Date of Patent: Feb. 18, 2014

(54) BAND STEERING

(75) Inventors: Stephane Laroche, Montreal (CA); Chi Thanh Hoang, Dollard-des-Ormeaux (CA); Gilbert Moineau, Lachine (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 13/164,357

(22) Filed: Jun. 20, 2011

(65) Prior Publication Data

US 2012/0322481 A1    Dec. 20, 2012

(51) Int. Cl.
*H04B 1/00*    (2006.01)
(52) U.S. Cl.
USPC ............... 455/41.2; 455/168.1; 455/188.1

(58) Field of Classification Search
USPC ............ 455/41.2, 168.1, 188.1, 509
See application file for complete search history.

(56) References Cited

U.S. PATENT DOCUMENTS

| | | | |
|---|---|---|---|
| 6,658,240 B1 * | 12/2003 | Ries | 455/183.1 |
| 7,039,358 B1 * | 5/2006 | Shellhammer et al. | 455/41.2 |
| 7,289,056 B2 * | 10/2007 | Liu et al. | 342/52 |
| 2011/0014876 A1 * | 1/2011 | Sakata et al. | 455/69 |

* cited by examiner

*Primary Examiner* — Tuan H Nguyen (57) ABSTRACT

A method for band steering includes, with a wireless access point, refraining from responding to a probe request from a client device on a first frequency band until a first period of time has elapsed if said client device is capable of communication on a second frequency band. The method further includes, with the wireless access point, responding immediately to a probe request from said client device on said second frequency band.

20 Claims, 6 Drawing Sheets

With a wireless access point, refrain from responding to a probe request from a client device on a first frequency band until a first period of time has elapsed if the client device is capable of communication on a second frequency band
(block 602)

With the wireless access point, respond immediately to a probe request from the client device on the second frequency band
(block 604)

*Fig. 6*

BAND STEERING

BACKGROUND

Client devices such as laptop computers are often connected to a network through wireless connections. These client devices include a wireless network adapter which transmits data to and receives data from a wireless access point that is part of the network structure. The wireless access point acts as an interface between the wireless devices and the wired network. Wireless access points will typically operate on either a 2.4 gigahertz (GHz) band or a 5 GHz band according to the 802.11 standards as defined by the Institute of Electrical and Electronics Engineers (IEEE).

Some wireless adapters may be designed to operate on only the 2.4 GHz band while some wireless adapters may be capable of operating on both the 2.4 GHz band and the 5 GHz band. A client device that is capable of communication on both frequency bands will typically prefer to connect on the 2.4 GHz band. This is because the signal on the 2.4 GHz band is generally stronger than the signal on the 5 GHz band. Furthermore, many wireless network adapter device drivers connect on the 2.4 GHz frequency band as a default. Client devices typically connect to the wireless access point and frequency band with the strongest signal. However, when too many client devices are connected to a wireless access point on the 2.4 GHz band, the efficiency of communication between the wireless access point and the client devices is diminished.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, when too many wireless access points that cover the same area are using the same channels within the 2.4 GHz band, the efficiency of communication between the wireless access point and the client devices is diminished. Because the 5 GHz frequency band can support higher transmission rates and more client devices, steering some of the client devices to the 5 GHz frequency band will increase the efficiency at which data is transferred over the network. Because there are multiple wireless access points which may be available to a client, band steering is often performed on the network level. Specifically, a network controller will manage the band steering processes on each of the access points. However, this results in increased management overhead by the network.

In light of this and other issues, the present specification discloses methods and systems for band steering that can be performed solely by a wireless access point without any direction from a network controller or data from other wireless access points. A single wireless access point can take into account the actions typically performed by a wireless adapter of a client device. A client device that is capable of communication on both the 2.4 GHz and the 5 GHz band will typically send out a probe request on both bands. A probe request is a signal that requests service information about a wireless access point so that the client device can determine if it would be preferable to connect to that wireless access point.

According to certain illustrative examples, a wireless access point will respond to a probe request on the 5 GHz band immediately while delaying the response to a probe request on the 2.4 GHz band for a small period of time. For example, the wireless access point may wait 200 milliseconds (ms) before responding to a probe request on the 2.4 GHz band. When the client device receives a response on the 5 GHz band immediately, it will presumably connect to the wireless access point on that band. This connection process is referred to as association.

In some cases, a client device may still attempt to associate with the wireless access point on the 2.4 GHz band despite the delayed response. According to certain illustrative examples, the wireless access point may ignore the first association request on the 2.4 GHz frequency band. This will further encourage the client device to try connecting on the 5 GHz frequency band. If the client device tries a second time to association on the 2.4 GHz frequency band, then the wireless access point may associate on the 2.4 GHz frequency band in order to avoid a complete denial of service to that client device.

Through use of methods and systems embodying principles herein, band steering can be effectuated by only the wireless access point. No changes to the manner in which a client device connects to a wireless access point are made. Furthermore, no changes are made to the network controller and networking protocols used by the network that includes the wireless access points. By steering some client devices to the less frequently used 5 GHz frequency band, data communication over the wireless portion of the network may become more efficient.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
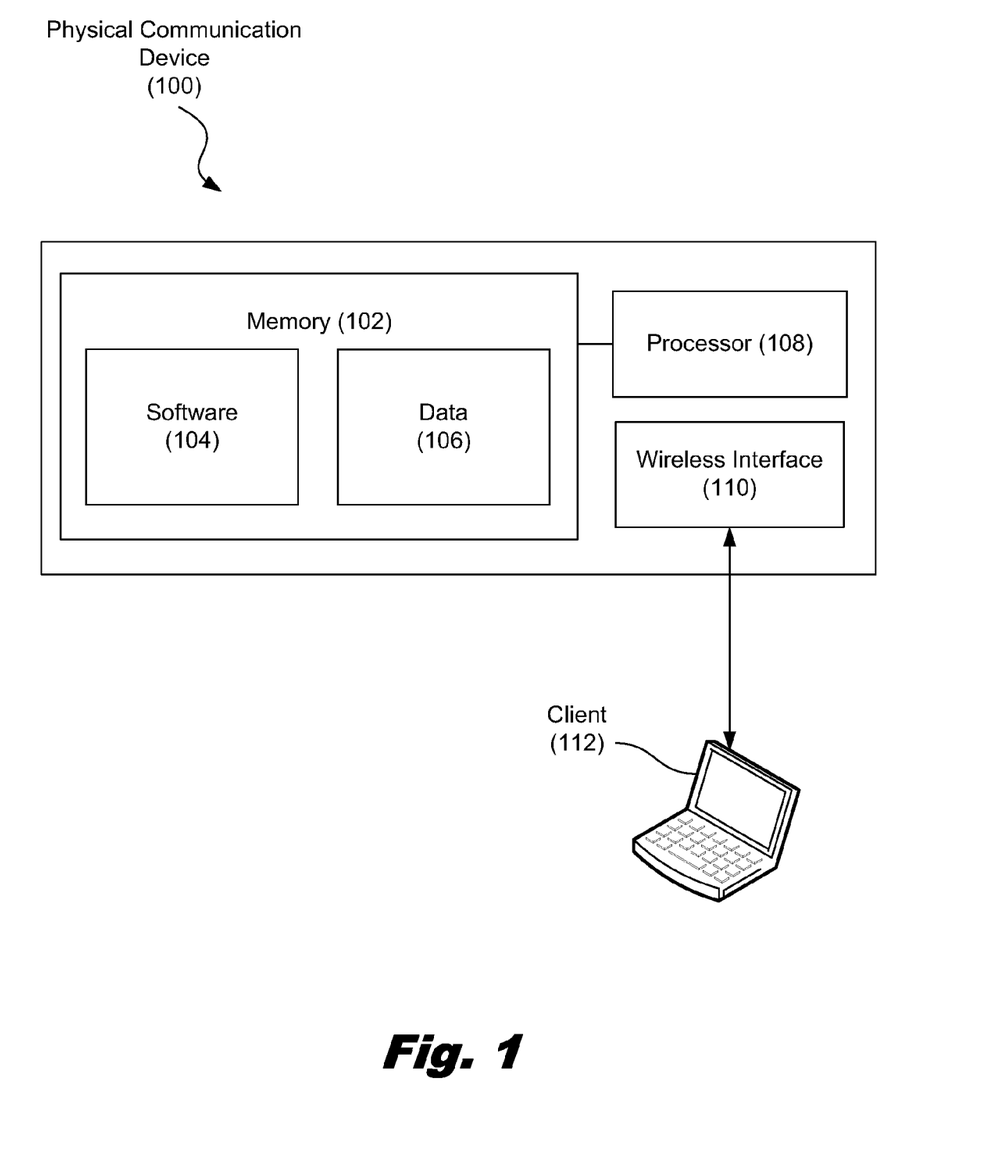
FIG. 1 is a diagram showing an illustrative physical communication device, according to one example of principles described herein.

Referring now to the figures, FIG. 1 is a diagram showing an illustrative physical communication device (100) such as a wireless access point. According to certain illustrative examples, the physical communication device (100) includes a memory (102) having software (104) and data (106) stored thereon. The physical communication device (100) also includes a processor (108) and a wireless communication interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical communication device (100) also includes a processor (108) for executing the software (104) and using or updating the data (106) stored in memory (102). The software (104) may include a specialized operating system for managing the hardware of the physical communication device. This software may also include routing software for routing data according to the appropriate protocols. The data (106) stored in memory may be information about various client devices (112) which may be or have been associated with the physical communication device.

A wireless interface (110) is used to communicate to client devices (112) wirelessly. Client devices may include, but are not limited to, desktop computers, laptop computers, tablet computers, and mobile smart phones. Wireless communication between devices is done by modulating electromagnetic waves being transmitted at certain frequencies. As mentioned above, wireless networking devices typically operate on either the 2.4 GHz frequency band or the 5 GHZ frequency band. The wireless interface may transmit data on a number of channels associated with a particular frequency band. Each channel may vary slightly in frequency within the respective frequency band. According to the 802.11 networking standards, independent and non-overlapping channels within the 2.4 GHz frequency band are spaced 25 megahertz (MHz) apart. Independent channels within the 5 GHz frequency band are spaced 20 MHz apart.

Within the 2.4 GHz frequency band, the wireless communication interface (110) can typically support up to three independent and non-overlapping channels when following 802.11 standards and abiding by government regulation. If more than three wireless access points overlap in the area that they cover, then they will have to share transmission time over the same channel. If too many devices are sharing transmission time, then the rate at which data is able to transfer between the wireless access point and the client devices is reduced. Furthermore, many other electronic devices such as cordless telephones and microwaves operate at 2.4 GHz. These devices may cause interference and slow down transmission rates. Therefore, it may be preferable to steer some client devices onto the 5 GHz frequency band if those client devices are capable of communication on that frequency band.

The 5 GHz frequency band is generally less crowded as some devices will only operate on the 2.4 GHz frequency band. Additionally, there is less interference on the 5 GHz frequency band because common electronic devices do not typically use that frequency band. Furthermore, the 5 GHz band has fewer overlapping channels. However, due to the smaller wavelengths associated with the 5 GHz frequency band, it generally has a smaller range. Thus, devices which are close enough to receive a strong signal on the 2.4 GHz frequency band may not receive a strong signal on the 5 GHz frequency band. Devices that are within range of the 5 GHz frequency band will, however, communicate well with the wireless access point on that frequency band.

Figure 2:
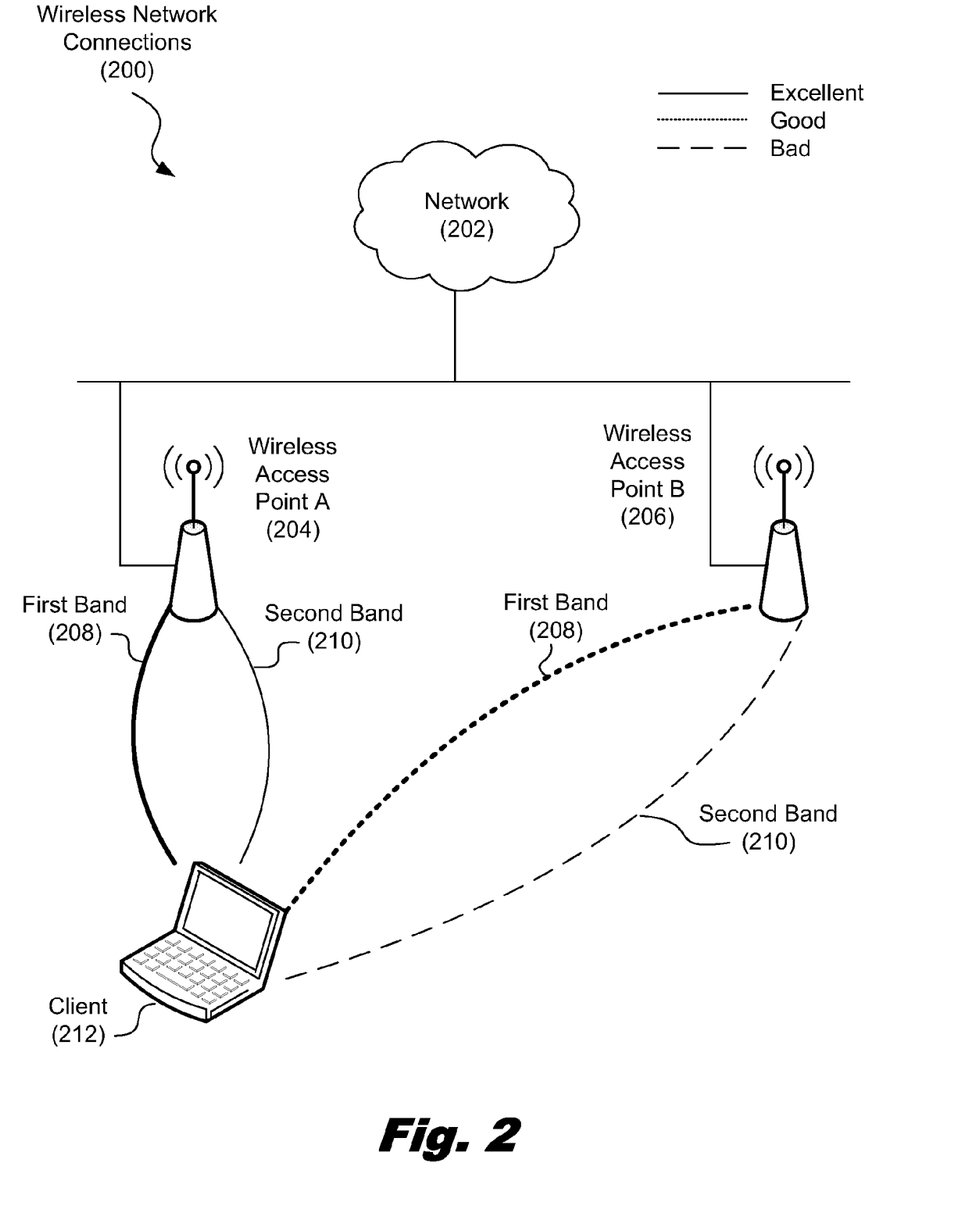
FIG. 2 is a diagram showing illustrative wireless network connections, according to one example of principles described herein.

FIG. 2 is a diagram showing illustrative wireless network connections (200). As mentioned above, a typical network (202) may include multiple access points (204, 206). A client device (212) will typically have more than one wireless access point available with which to associate. The software running the wireless adapter of the client device will typically be designed to associate with the wireless access point that provides the strongest signal. If the client is capable of communication on both a first frequency band (208) and a second frequency band (210) (e.g. the 2.4 GHz frequency band and the 5 GHz frequency band), then it will typically determine which of those frequency bands are preferable.

According to certain illustrative examples, a client device (212) is capable of communication on a first frequency band (208) and a second frequency band (210). When that client device (212) attempts to connect to the network (202) through either wireless access point A (204) or wireless access point B (206), it will first determine which access point provides a better signal. In this example, the strength of the signal on the first frequency band (208) to wireless access point B (206) is good and the strength of the signal on the second frequency band (210) is bad. Regarding the signal strength to wireless access point A (204) the signal is excellent for both the first frequency band (208) and the second frequency band (208). Thus, the client device (212) will presumably attempt to associate with wireless access point A (204).

Figure 3:
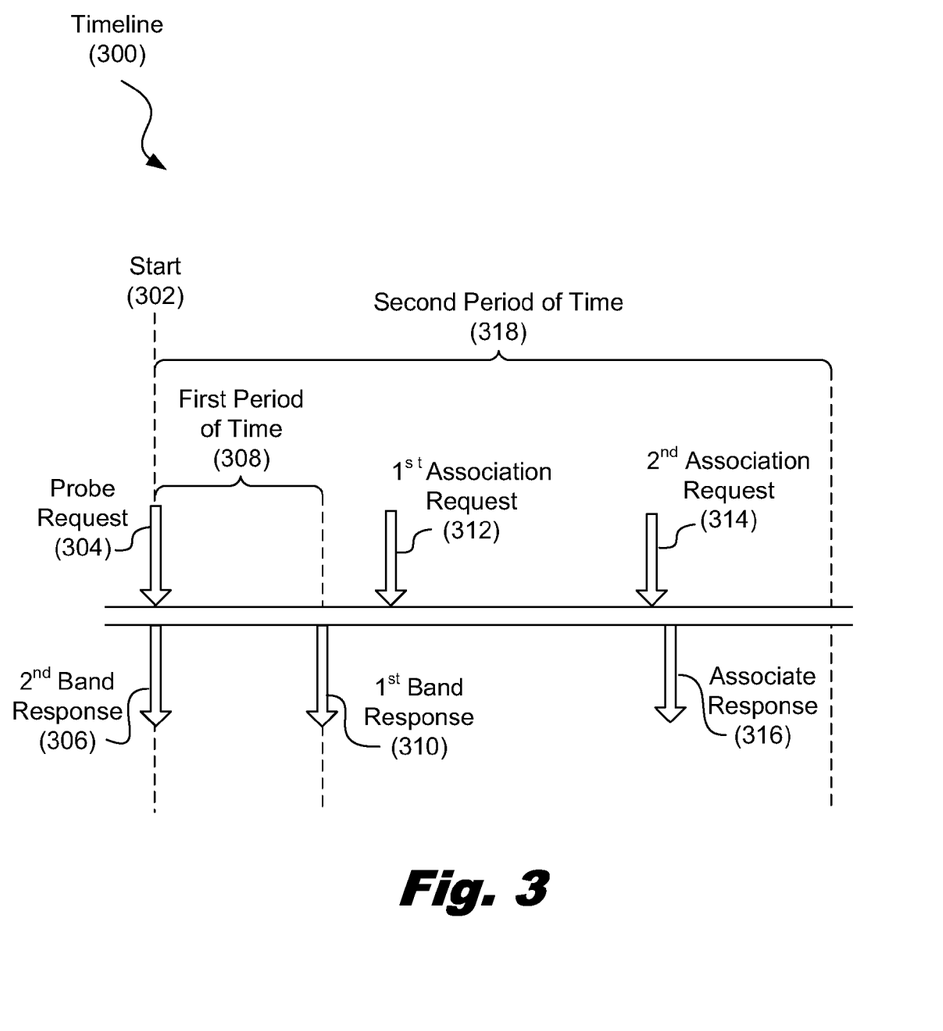
FIG. 3 is a diagram showing an illustrative timeline for a band steering process, according to one example of principles described herein.

FIG. 3 is a diagram showing an illustrative timeline (300) for a band steering process. The band steering process starts (302) when a wireless access point receives a probe request (304) from a client device. If the client device is capable of communication on both a first frequency band and a second frequency band, then the wireless access point will receive the probe request on both frequency bands. The wireless access point will then immediately respond to the probe request by sending a response (306) on the second frequency band. However, the wireless access point will wait for a period of time (308) before sending a response (310) on the first frequency band.

If the signal strength on the second frequency band is sufficiently strong, then the client device will likely attempt to associate on the second frequency band. This will be done by sending an association request on the second frequency band to the wireless access point. Upon reception of the association request, the wireless access point will then begin the standard protocol negotiation process that will establish a connection between the client device and the wireless access point. At this point, the client device may not have access to the network. A further authentication process such as a provided username and password may be needed for network access. However, the wireless connection is established upon successful association.

If the wireless access point does not associate with the second frequency band during the first period of time (308), then the wireless access point will respond to the probe request on the first frequency band (310). After receiving the delayed response from the wireless access point, the client device may decide to associate on the first frequency band despite the delay. In this case, the client will send a first association request (312) to the wireless access point. However, to further encourage the client device to try to associate on the second frequency band, the first association request may be ignored. If the client device again tries to associate on the first frequency band, then the wireless client may send the appropriate response (316) that will allow the client device to associate on the first frequency band.

In some cases, the wireless access point may be designed to associate on any subsequent number of requests. However, the number of association attempts allowed before the client device is associated should be limited to avoid a complete denial of service to the client. It may be the case that there is very poor reception on the second frequency band. Additionally or alternatively the channels on the second frequency band may be full.

After sending out the response (310) to the first frequency band, the wireless access point may not receive any signal from the client device for a particular period of time. After this second period of time (318), the process can be reset so that if the wireless access point receives another probe request, it will treat that probe request as if it were being received for the first time.

Figure 4:
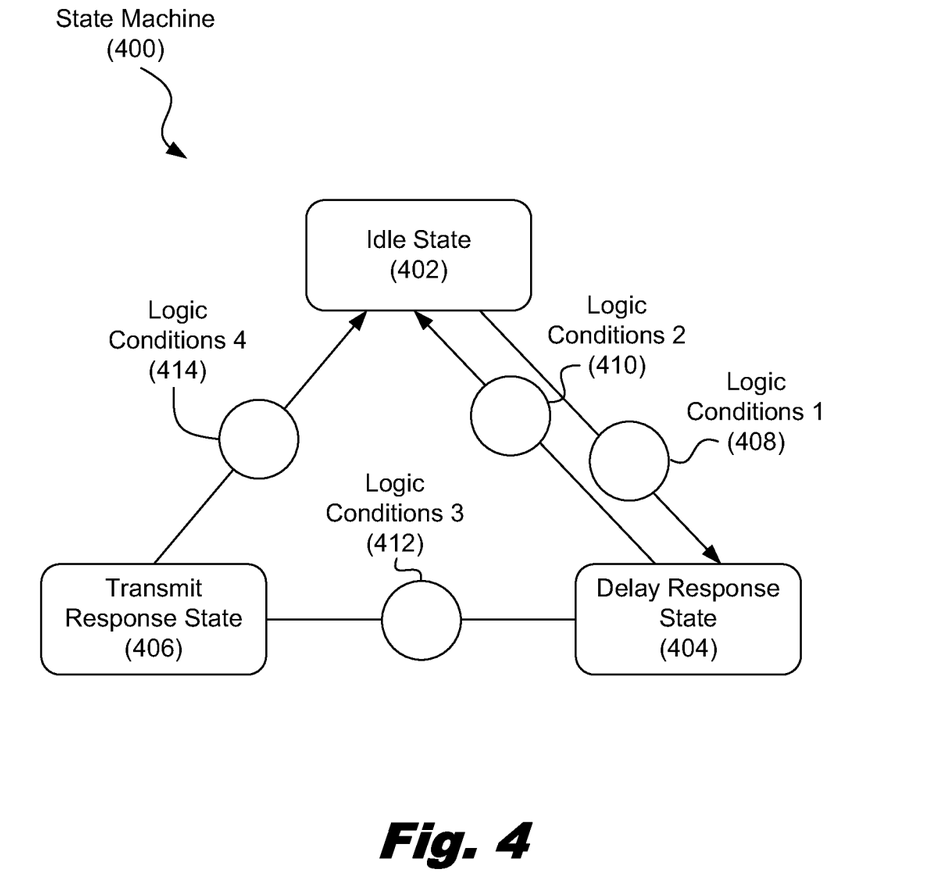
FIG. 4 is a diagram showing an illustrative state machine model to be implemented by a wireless access point, according to one example of principles described herein.

FIG. 4 is a diagram showing an illustrative state diagram for a state machine (400) that may be implemented by a wireless access point. A state diagram is used to illustrate the states of a state machine and under what conditions the state machine transitions between those states. According to certain illustrative examples, the state machine may have at least three states including an idle state (402), a delay response state (404), and a transmit response state (406). Under certain logical conditions (408, 410, 412, 414), the state machine may transition between these states. The states illustrated and described herein are not an exhaustive list of all possible states that may be used by a state machine embodying principles described herein.

The idle state is the initial state in which the state machine (400) operates. In this state, the wireless access point essentially does nothing until it receives a probe request. The logic condition (408) that allows the state machine to transition to the delay response state (404) is reception of a probe request from a client device that is currently unassociated with the wireless access point. Probe requests from client devices that are already associated with the wireless access point will be handled as normal. Specifically, the wireless access point will respond immediately despite the frequency band being used by that client device.

While in the delay response state (404), the state machine starts a timer for a first period of time. In one example, this amount of time is 200 milliseconds. While in this state, the wireless access point will not respond on the 2.4 GHz frequency band. If the received probe request is considered to be a first probe request, then the wireless access point will also start a second timer for a longer period of time. This period of time may be, for example, 1000 milliseconds. Any probe requests received by the wireless access point before the second timer expires will not be considered "first" probe requests. The logic conditions (410) that will transition the state machine back to the idle state will be if the second timer expires. The logic conditions (412) to transfer to the transmit response state (406) are when the first timer expires.

While in the transmit response state (406), the wireless access point will reply to the probe request on the 2.4 GHz frequency band. The logic conditions (414) to transition back to the idle state are when the second timer expires. After the second timer expires, the wireless access point will go back to the initial idle state (402). While in the idle state, the wireless access point will treat any received probe request as a "first" request.

Figure 5:
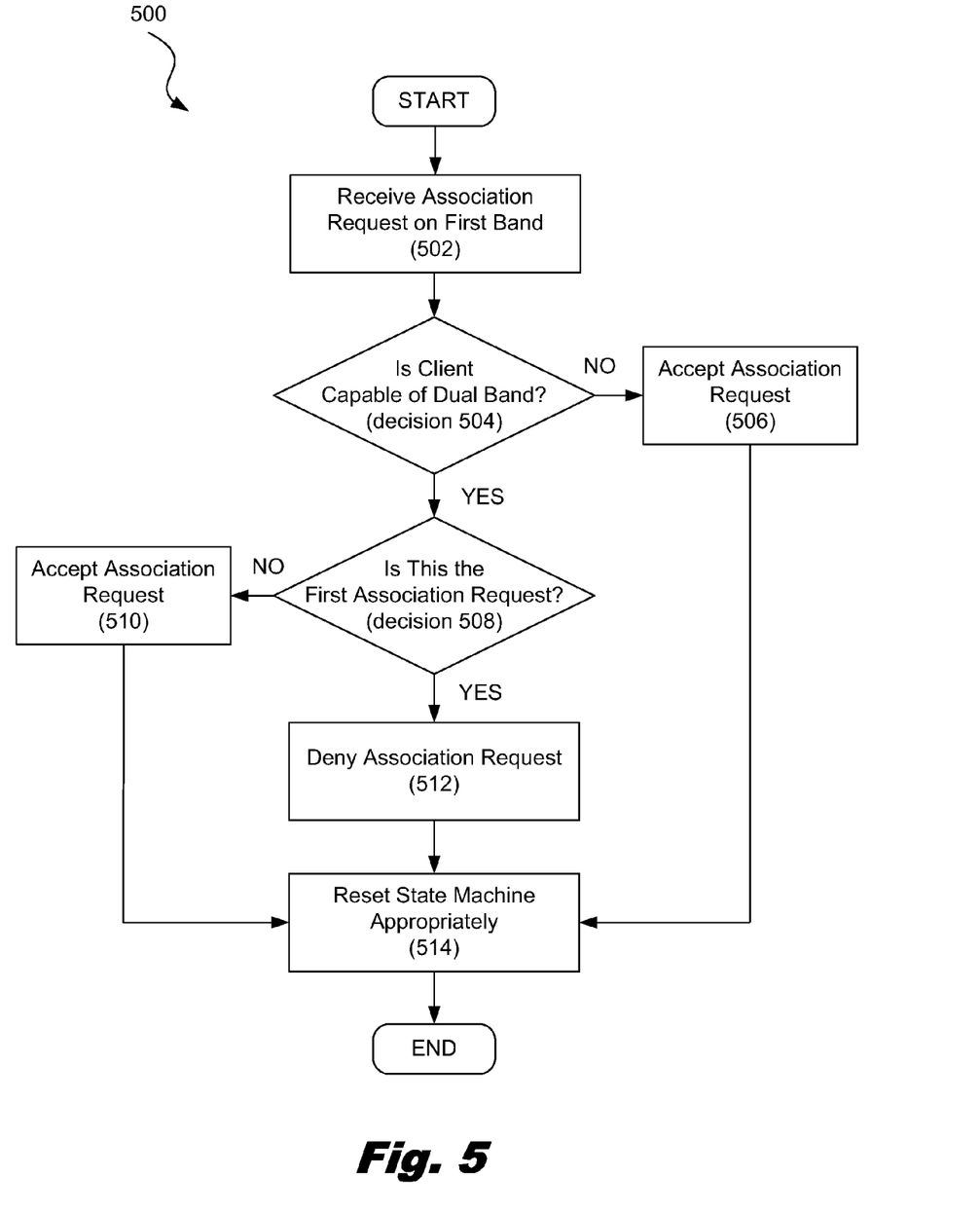
FIG. 5 is a flow diagram showing an illustrative process for handling association requests when band steering, according to one example of principles described herein.

FIG. 5 is a flow diagram showing an illustrative process (500) for handling association requests when band steering. After a client device receives a response to a probe request from a wireless access point, the client device may decide to associate with that wireless access point. The client device will then send an association request to that wireless access point. The process (500) starts when the wireless access point receives (502) that probe request.

After receiving the probe request, the wireless access point determines (decision 504) whether or not the client device is capable of communication on both the 2.4 GHz frequency band and the 5 GHz frequency band. Such a client device is referred to as being dual band capable. The wireless access point can determine whether a client device is dual band capable or not based on whether it receives a probe request on both frequency bands. For example, if the wireless access point only receives a probe request on the 2.4 GHz frequency band, then the wireless access point may assume that the client device is only capable of communication on that frequency band. However, if the wireless access point receives a probe request on both frequency bands, then it can be known that the client device is dual band capable.

If it is determined that the client device is not (decision 504, NO) dual band capable, then the wireless access point will accept (506) the association request. The state machine will then be reset (514) appropriately. That is, the state machine will go back to the initial idle state. If it is determined that the client device is indeed (decision 504, YES) dual band capable, then the wireless access point will then determine (decision 506) whether or not this is the first association request within a given period of time.

If it is determined that the association request is indeed (decision 506, YES) the first association request received by the client device, then the wireless access point will deny (512) the association request. The state machine will then be reset (514) appropriately. Specifically, the state machine will remain in the delay response state. By denying the first association request, the client device is encouraged to try to associate on the 5 GHz frequency band.

If it is determined that the association request is not (decision 506, NO) the first association request within the given period of time, then the wireless access point will accept the association request and begin the negotiation process that will allow the client device to associate on the 2.4 GHz band. This allows the client device to eventually associate with the wireless access point in order to prevent a complete denial of service to the client device.

According to certain illustrative examples, it may be the case that a client device which is already associated on the 5 GHz frequency band may send a probe request on the 2.4 GHz frequency band. In this case, the wireless access point can ignore that request to encourage the client device to stay on the 5 GHz frequency band. However, the wireless access point will also make sure that the signal strength on the 5 GHz frequency band is above a predetermined threshold before ignoring the probe request. If the signal level on the 5 GHz frequency band is too low, there is a good reason for the client device to switch to the 2.4 GHz frequency band.

For example, the wireless access point may receive a probe request on the 2.4 GHz band from a client device that is already associated on the 5 GHz frequency band. The wireless access point will then determine whether the signal strength on the 5 GHz frequency band is above a predetermined threshold level of −80 dBm (decibels to milliwatt). If the signal strength is above that threshold, then the wireless access point will ignore the probe request. However, if the signal strength is below that threshold then the wireless access point will respond to that probe request as usual. If the client device decides that switching to the 2.4 GHz frequency band would be more efficient, then it will do so.

Figure 6:
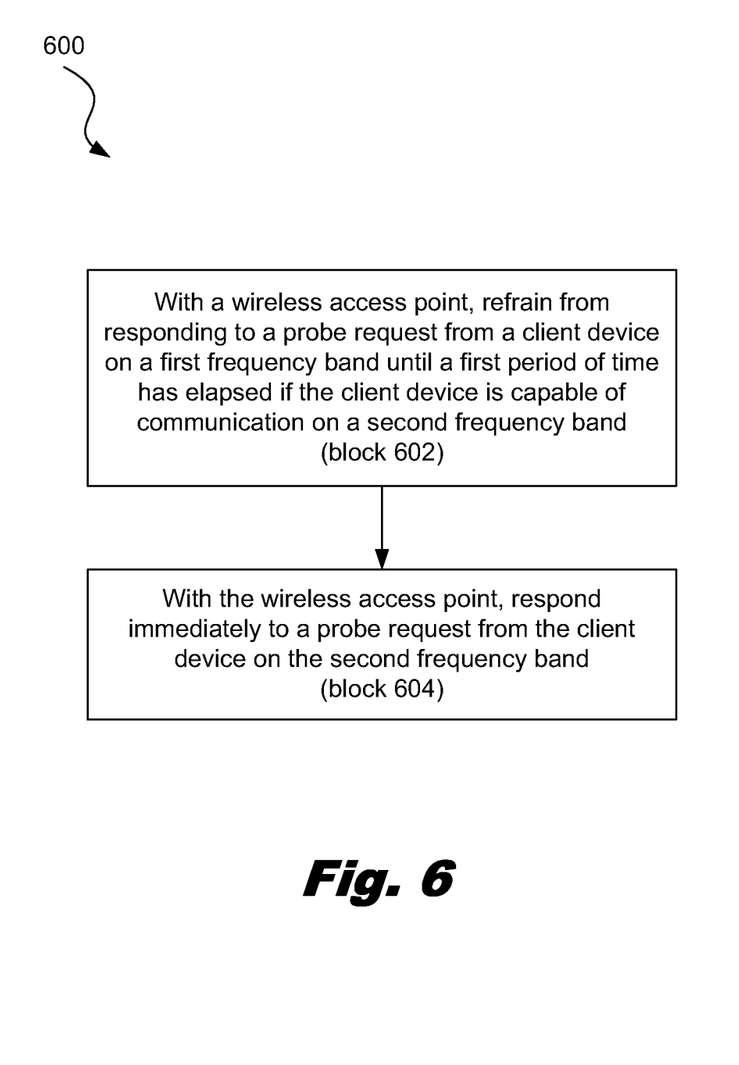
FIG. 6 is a flowchart showing an illustrative method for band steering, according to one example of principles described herein.

FIG. 6 is a flowchart showing an illustrative method (600) for band steering. According to certain illustrative examples, the method includes, with a wireless access point, refraining (block 602) from responding to a probe request from a client device on a first frequency band until a first period of time has elapsed if the client device is capable of communication on a second frequency band. The method further includes, with the wireless access point, responding (block 604) immediately to a probe request from the client device on the second frequency band.

In conclusion, through use of methods and systems embodying principles herein, band steering can be effectuated by only the wireless access point. No changes to the manner in which a client device connects to a wireless access point are made. Furthermore, no changes are made to the network controller and networking protocols used by the network that includes the wireless access points. By steering some client devices to the less frequently used 5 GHz frequency band, data communication over the wireless portion of the network may become more efficient.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for band steering, the method comprising: with a wireless access point, refraining from responding to a probe request from a client device on a first frequency band until a first period of time has elapsed when said client device is capable of communication on a second frequency band; and with said wireless access point, responding immediately to a probe request from said client device on said second frequency band.

2. The method of claim 1, further comprising, with said access point:
   refusing a first association request from said client device on said first frequency band; and
   allowing said client device to associate with said wireless access point in response to a subsequent association request on said first frequency band from said client device that is received before a second period of time has elapsed.

3. The method of claim 2, wherein said subsequent association request is a third or higher association request made before said second period of time has elapsed.

4. The method of claim 1, further comprising, with said wireless access point, ignoring a probe request from a client device on said first frequency band when that client device is already associated on said second frequency band and a signal strength of said second frequency band is above a predetermined threshold level.

5. The method of claim 1, further comprising, with said wireless access point, responding immediately to said probe request on said first frequency band when said client device is not capable of communication on said second frequency band.

6. The method of claim 1, further comprising, with said wireless access point, responding immediately to said probe request on said first frequency band when a number of client devices on said second frequency band is at a maximum.

7. The method of claim 1, further comprising, with said client device, attempting to associate on said second frequency band in response to not receiving a response to said probe request within said first period of time.

8. The method of claim 1, in which said first frequency band comprises a 2.4 GHz band and said second frequency band comprises a 5 GHz band.

9. The method of claim 1, in which said first period of time ranges between 100 and 300 milliseconds.

10. The method of claim 1, further comprising determining whether said client device is capable of communication on said second frequency band based on whether said wireless access point receives a probe request from said client device on said second frequency band.

11. A communication device comprising: a wireless communication interface; a processor; and a memory communicatively coupled to said processor; in which said processor is to: refrain from responding to a probe request from a client device on a first frequency band until a first period of time has elapsed when said client device is capable of communication on a second frequency band; and respond immediately to a probe request from said client device on said second frequency band.

12. The device of claim 11, in which said processor is further to:
   refuse a first association request from said client device; and
   allow said client device to associate with said wireless access point in response to a subsequent association request from said client device that is received before a second period of time has elapsed.

13. The device of claim 11, wherein said processor is further to ignore a probe request from a client device on said first frequency band when that client device is already associated on said second frequency band and a signal strength of said second frequency band is above a predetermined threshold level.

14. The device of claim 11, in which said processor is further to respond immediately to said probe request on said first frequency band when said client device is not capable of communication on said second frequency band.

15. The device of claim 11, in which said processor is further to respond immediately to said probe request on said first frequency band when a number of client devices on said second frequency band is at a maximum.

16. The device of claim 11, in which said client device is to attempt to associate on said second frequency band in response to not receiving a response to said probe request within said first period of time.

17. The device of claim 11, in which said first frequency band comprises a 2.4 GHz band and said second frequency band comprises a 5 GHz band.

18. The device of claim 11, in which said first period of time ranges between 100 and 300 milliseconds.

19. A method for band steering, the method comprising: with a wireless access point, refusing a first association request received by a client device on a first frequency band when said client device is capable of communication on a second frequency band; and with said wireless access point, allowing said client device to associate with said wireless access point in response to a subsequently received association request from said client device on said first frequency band; wherein said subsequently received association request is received within a predetermined period of time from when said first association request is received.

20. The method of claim 19, further comprising determining whether said client device is capable of communication on said second frequency band based on whether said wireless access point receives a communication from said client device on said second frequency band.

* * * * *